United States Patent
Yeh

(10) Patent No.: US 7,361,999 B2
(45) Date of Patent: Apr. 22, 2008

(54) BODY-CARRYING HUMAN POWER GENERATION SYSTEM

(76) Inventor: Ming-Hsiang Yeh, 14F, No. 375, Nan-Gang District, Fu De Street, Taipei City (TW)

( * ) Notice: Subject to any disclaimer, the term of this patent is extended or adjusted under 35 U.S.C. 154(b) by 223 days.

(21) Appl. No.: 11/258,234

(22) Filed: Oct. 26, 2005

(65) Prior Publication Data
US 2007/0096469 A1 May 3, 2007

(51) Int. Cl.
*F02B 63/04* (2006.01)
*F03G 7/08* (2006.01)
*H02K 7/18* (2006.01)

(52) U.S. Cl. ........................... 290/1 R; 290/1 C
(58) Field of Classification Search ............ 290/1 R, 290/1 C, 1 D, 1 E
See application file for complete search history.

(56) References Cited

U.S. PATENT DOCUMENTS

| | | | | |
|---|---|---|---|---|
| 3,675,113 A | * | 7/1972 | Bader et al. .................. 322/28 |
| 3,800,212 A | * | 3/1974 | Branco et al. ................ 322/28 |
| 4,032,829 A | * | 6/1977 | Schenavar ..................... 322/3 |
| 4,287,428 A | * | 9/1981 | Smith .......................... 290/1 E |
| 5,818,132 A | * | 10/1998 | Konotchick .................. 310/17 |
| 5,917,310 A | * | 6/1999 | Baylis ............................ 322/1 |
| 6,204,568 B1 | * | 3/2001 | Runner ..................... 290/1 R |
| 6,281,594 B1 | * | 8/2001 | Sarich ....................... 290/1 R |
| 6,744,260 B2 | * | 6/2004 | Schmalz et al. ............ 324/555 |
| 6,858,951 B2 | * | 2/2005 | Liao .......................... 290/1 C |
| 6,897,573 B1 | * | 5/2005 | Shah .......................... 290/1 A |
| 6,982,497 B2 | * | 1/2006 | Rome ........................ 290/1 A |
| 2007/0007827 A1 | * | 1/2007 | Harris et al. .................. 310/15 |

\* cited by examiner

*Primary Examiner*—Julio C. Gonzalez
(74) *Attorney, Agent, or Firm*—Troxell Law Office, PLLC

(57) ABSTRACT

A human power generation system includes a generation module and a generator. The generation module includes two speed-up great sets and a rack. Each speed-up gear set includes a shaft to which a pinion and a gear are coaxially mounted. The pinion of the first gear set engages the rack. The gear of the first gear set engages the pinion of the second gear set. The gear of the second gear set is drivingly coupled to the generator. Thus, by attaching the system to a wearer by a mounting device, the systems continuously operates by the natural activity of the wearer and the rack drives, through the gear sets, the generator to generate electrical power.

7 Claims, 4 Drawing Sheets

BODY-CARRYING HUMAN POWER GENERATION SYSTEM

FIELD OF THE INVENTION

The present invention generally relates to a body-carrying human power generation system that makes use of continuous natural activity of human body, such as breathing, and gravity to generate electrical power, and is suitable to arrange with waistband or backpack or the likes.

BACKGROUND OF THE INVENTION

Portable electrical/electronic devices, such as mobile phones, radios, walkmans, and digital playing devices, are powered by primary or secondary cells. A use must check with the power storage level before he or she runs these devices. The power storage of the battery, especially the primary cells, is limited and once exhausted, the battery is disposed of. This causes a serious problem in environmental protection for most of the currently available primary cells, including mercury cells and lithium cells, contain toxicant substances. Thus, for protection of the Earth, the consumption of cells must be reduced.

To eliminate the use of cells, a solution of human power generation is provided, which comprises an air compressor, which makes use of the movement of human body to induced compressed air; magnets, which are rotated by the compressed air; an electromagnetic device, which induces electrical voltage by an external time-variable magnetic field; a circuit, which converts alternate current into direct current and stores the electrical energy; and a hood, which houses the magnets and the electromagnetic device.

Such a conventional device, although effective to generate electrical power by human body movement, yet intentional activity of the wearer is required for operating the device. Thus, a human power generation system that makes use only of natural activity of human body, such as breathing or pressure difference induced by gravity due to walk of human body, is needed to ease the operation of the human power generation.

SUMMARY OF THE INVENTION

A primary objective of the present invention is to provide a human power generation system that works on natural activity of human body, such as breathing, or pressure difference caused by gravity due to human movement.

A secondary objective of the present invention is to provide a load-less human power generation system, which allows for continuous generation of electrical power without being apparently sensed by a user.

To achieve the above objectives, in accordance with the present invention, a human power generation system comprises a generation module and a generator. The generation module comprises two speed-up great sets and a rack. Each speed-up gear set comprises a shaft to which a pinion and a gear are coaxially mounted. The pinion of the first gear set engages the rack. The gear of the first gear set engages the pinion of the second gear set. The gear of the second gear set is drivingly coupled to the generator. Thus, by attaching the system to a wearer by a mounting device, the systems continuously operates by the natural activity of the wearer and the rack drives, through the gear sets, the generator to generate electrical power.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
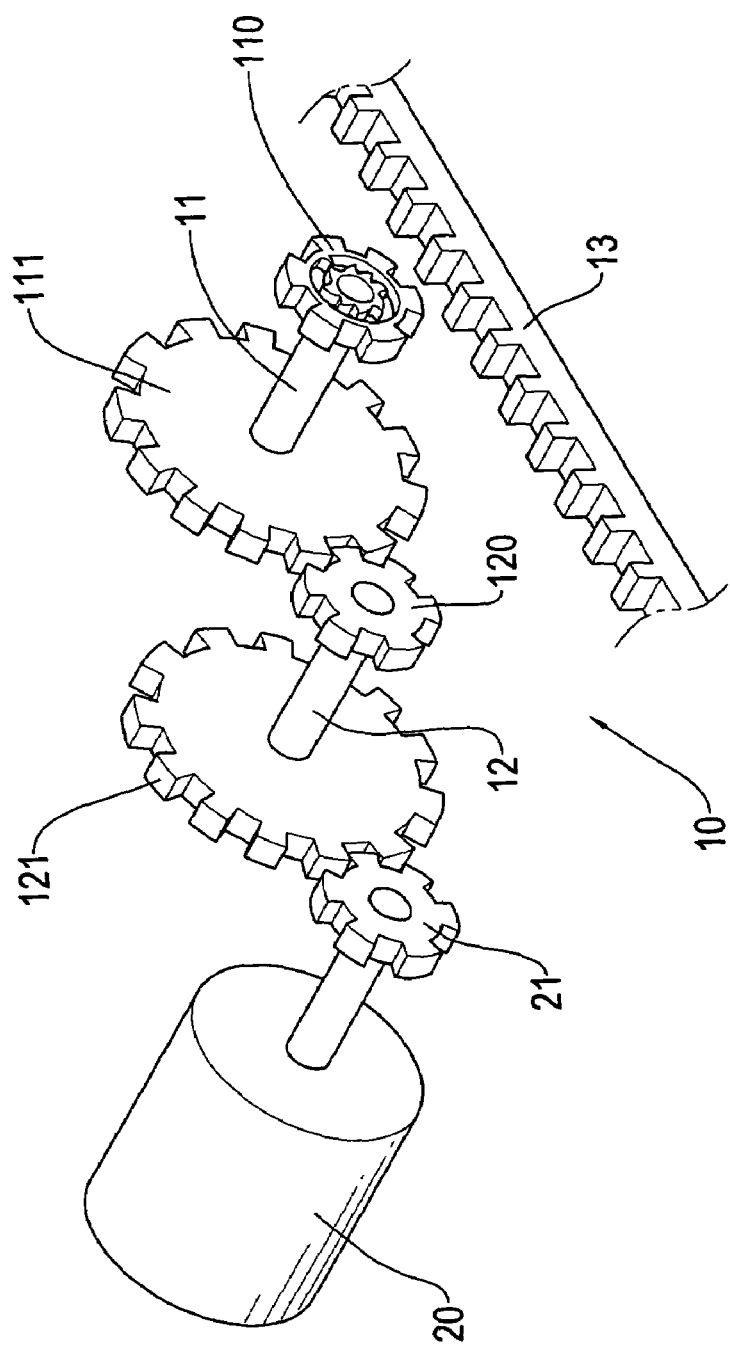
FIG. 1 is a perspective view of a human power generation system device constructed in accordance with the present invention.

With reference to the drawings and in particular to FIG. 1, a human power generation system constructed in accordance with the present invention comprises a generation module 10 and a generator 20. The generation module 10 comprises a rack 13 and two speed-up gear sets each comprising a shaft 11, 12. The first speed-up gear set 11 comprises a one-way pinion 110 mounted at a front end of the shaft 11 and a gear 111 mounted at a rear end of the shaft 11 and having a nominal diameter greater than that of the pinion 110. The second speed-up gear set comprises a pinion 120 mounted at a front end of the shaft 12 and a gear 121 mounted at a rear end of the shaft 12 and having a nominal diameter greater than that of the pinion 120. The power generator 20 comprises a spindle (not labeled) to which a gear 21 is mounted.

The one-way pinion 110 of the first shaft 11 mates the rack 13 and the first gear 111 of the first shaft 11 mates the second pinion 120 of the second shaft 12. The second gear 121 of the second shaft 12 engages the gear 21 of the generator 20. Thus, when the rack 13 moves in a given direction, such as rightward as viewed in the drawing sheet, the one-way pinion 110 of the first shaft 11 is driven, which causes synchronous rotation of the first gear 111 that is mounted to the same first shaft 11. The first gear 111, due to engagement with the second pinion 120 of the second shaft 12, forces the second pinion 120 and thus the second gear 121 to rotate therewith. Consequently, the gear 21 of the generator 20 that engages the second gear 121 is caused to rotate and thus induce electrical power in the generator 20.

Figure 2:
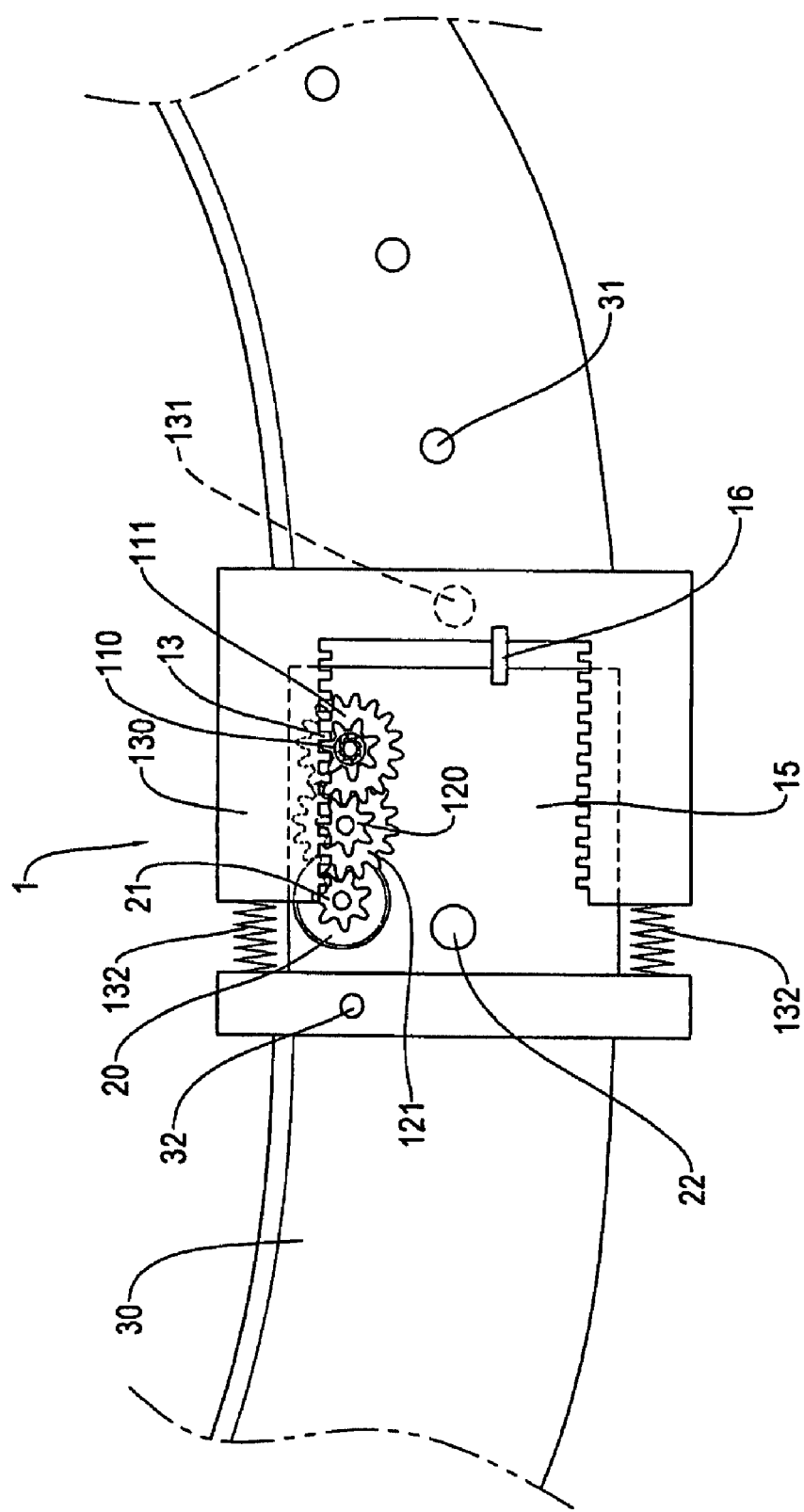
FIG. 2 is a schematic view illustrating the human body generation system of the present invention embodied as a waistband comprising a belt and a buckle.

Also referring to FIG. 2, an embodiment of the human power generator of the present invention is shown, which is embodied in the form of a belt and buckle set, comprising a belt 30, such as waistband, and a buckle 1. At an end portion of the belt 30, a test light 32 is mounted and at an opposite end portion of the belt 30, punch holes 31 are formed. The buckle 1 comprises a lying-U-shaped frame 130 and a central body 15. The frame 130 has two limbs, which extend in a horizontal direction in the drawing sheet, and a base, which extends in a vertical direction in the drawings sheet, connecting the limbs. An inner edge of one limb, preferably, the upper one, form teeth to serve as the rack 13 depicted in FIG. 1. The base of the frame 130 forms a projection 131 and a locking member (not labeled). A resilient member 132, such as a spring, is mounted to a free end of each limb of the frame 130.

The central body 15 comprises a counterpart lock member 16, and supports the generation module 10 and the generator 20. Also formed on the central body 15 is a control button 22 that allows for manual control of the operation of the generator 20.

The frame 130 is positioned outside and partly surrounding the central body 15 and the rack 13 engages the one-way pinion 110 of the first shaft 11 of the generation module 10. The central body 15 is mounted to the end of the belt 30 to which the test light 32 is mounted, and the springs 132 that are mounted to the free ends of the limbs of the frame 130 are connected to the same end of the belt 30. The test light 32 is electrically connected to output terminals of the generator 20. If desired, the output terminals of the generator 20 can be connected to other power consuming elements, such as light-emitting diodes.

The projection 131 of the frame 130, which serves as a pin of the belt buckle, is selectively engageable with the punch holes 31 of the belt. The lock members 16 can mate to each to secure the frame 130 to the central body 15. This fixes the frame 130 and the central body 15 together. No relative displacement or movement between the frame 130 and the central body 15 is available. And the frame 130 and the central body 15 together serve as a single buckle 1 of the waistband. Under this circumstance, the power generator 20 does not work and no electricity is generated. When the lock members 16 are released or unlocked, the frame 130 is allowed to move with respect to the central body 15 due to the resiliency of the springs 132. When a wearer of the waistband breathes, the torso of the wearer, especially the stomach, expands and contracts. The expansion of the wearer's torso causes the frame 130 to move away from the central body 15 and the rack synchronously rotates the one-way pinion 110, which in turn causes the first gear 111 to drive the second pinion 120 and the second gear 121, eventually causing the generator 20 to operate and thus generating electrical power. The test light 32 illuminates when the generator 20 works.

As mentioned previously, the output terminals of the generator 20 can be connected to a power consuming device, which is that powered by the electricity from the generator 20. Alternatively, the output terminals of the generator 20 can be wired to an electrical storage by which the electrical power of the generator 20 is stored for consequent use, or a charging device for charging for example secondary cells.

The control button 22 provides the wearer with manual control of the generator 20. By actuating the control button 22, the generator 20 can be selectively shut down to avoid power generation even when the frame 130 is not secured to the central body 15 by the lock members 16.

Figure 3:
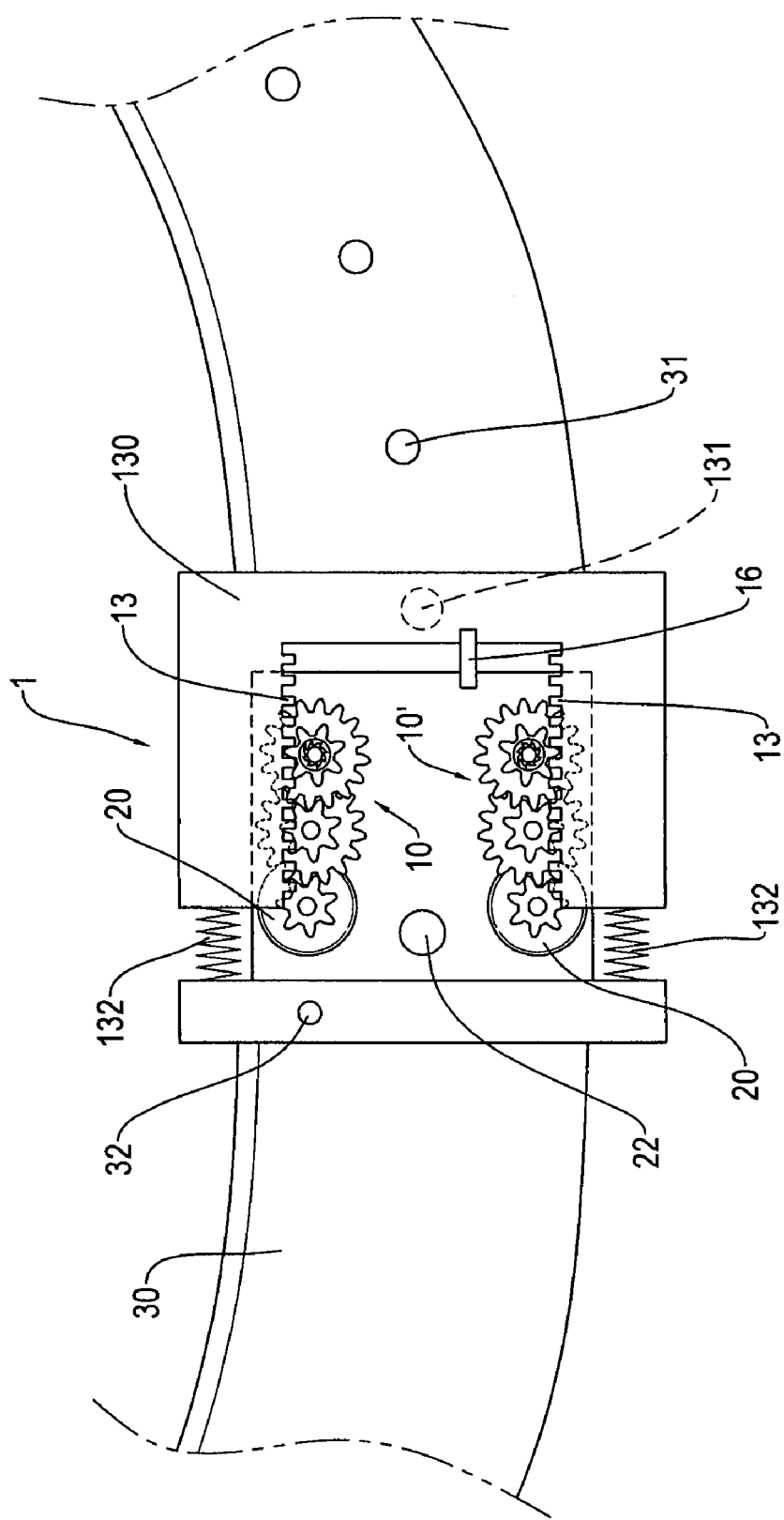
FIG. 3 is similar to FIG. 2 but showing a modification of the device shown in FIG. 2.

FIG. 3 shows a modification of the human power generation system of the present invention. In the modified human power generation system depicted in FIG. 3, an additional set of generation module 10' and generator 20' are mounted to the central body 15, which are identical to the generation module 10 and generator 20 gear-mating to the inner edge rack of the upper limb of the frame 130. Thus, identical parts or members will be designated with the same reference numerals with a postfix prime.

The generation module 10' comprises a first shaft 11' having formed at an end thereof a one-way pinion 110', which is arranged to operate in a reverse direction with respect to that of the one-way pinion 110 and which engages a rack 13 formed along an inner edge of the lower limb of the frame 130. Thus, when the torso of the wearer expands, the one-way pinion 110 of the upper side generation module 10 is driven by the upper rack 13 of the upper limb of the frame 130 to induce power generation in the generator 20. However, the lower side one-way pinion 110' is not rotated by the lower side rack 13 of the frame 130. When the torso of the wearer contracts, the lower side one-way pinion 110' is driven by the lower side rack 13 to generate power in the lower side generator 20', but the upper side one-way pinion 110 is now in idle. In this case, the springs 132 can be omitted.

Figure 4:
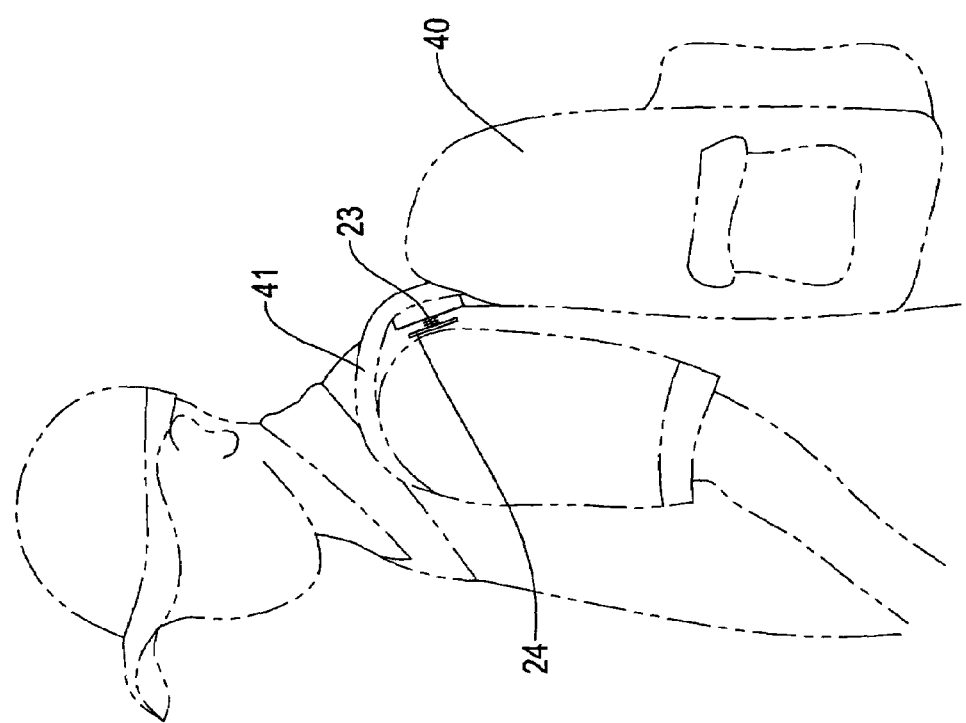
FIG. 4 is a schematic view illustrating the human body generation system of the present invention embodied as an accessory of a backpack.

Although the generator 20, 20' illustrated previously is a rotary device, it can be a positive displacement device, wherein the generator takes a reciprocal linear movement to generate electrical power. An example is illustrated in FIG. 4, in which the generator is arranged between the back of a wearer and a shoulder strap 41 of a back pack, which is designated with reference numeral 40 in FIG. 4. The generator comprises a reciprocating shaft (not shown) encompassed by a resilient member 23, such as a spring, and a back support board 24 mounted to a free end of the shaft and positionable against the back of the wearer. The spring 23 is arranged between the board 24 and the generator.

Due to the weight of the stuffs packed inside the back pack 40, when the pack wearer walks, the spring 23 is repeatedly compressed by the board 41 that receives a reaction force from the back of the wearer, and released again. The generator is designed in such a way to take the reciprocal linear movement and generates electrical power.

The output terminals of the generator can be connected to an up-converter or a down-converter to provides output voltage of different levels.

Further, a number of such generators can be connected together to provide output current or power of different levels.

Thus, the human power generation system of the present invention offers the following advantages:

(1) The human power generation system has a simple construction, which when worn in a user's body, can continuously operates in a non-stop manner, with a very limited load or nearly no load taken by the wearer for the operation of the generation makes only use of the natural activity of the wearer.

(2) The quantity of battery or cell is reduced and environmental protection is enhanced.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A power generation comprising: a generation module, a generator, and a mounting device, the generation module comprising a rack and two speed-up gear sets each comprising a shaft having a pinion and a gear mounted to opposite ends thereof, the pinion of a first one of the shafts engaging the rack, the gear of the first shaft engaging the pinion of a second one of the shafts, the gear of the second shaft being in driving coupling with the generator, the mounting means comprises a belt and a buckle, the buckle comprising a frame and a central body, the frame having an inner edge forming teeth to serve as the rack, the central body supporting the generation module and the generator, the frame surrounding partly the central body with the rack engaging the pinion of the first shaft, the central body fixed to an end of the belt, and the frame being connected to the central body by the means of resilient members, whereby by attaching the power generation system to a mounting means fixed on a living creature, the rack is driven to move by a nature activity of the creature and the movement of the rack is transmitted to the gear sets to cause operation of the generator and thus generating electrical power.

2. The power generation system as claimed in claim 1, wherein the generator comprises a rotary power generation device.

3. The power generation system as claimed in claim 1, wherein the pinion of the first shaft comprises a one-way pinion.

4. The power generation system as claimed in claim 1, wherein the generator is controlled by a control button and is electrically connected to a test light for verification of the operation thereof.

5. The power generation system as claimed in claim 1, wherein output terminals of the generator are connected to an up-converter/down-converter.

6. The power generation system as claimed in claim 1, wherein output terminals of the generator are connected to a charging device.

7. The power generation system as claimed in claim 1, wherein output terminals of the generator are connected to an electrical storage.

* * * * *